(12) United States Patent
    Gribov

(10) Patent No.:    US 12,607,607 B2
(45) Date of Patent:     Apr. 21, 2026

(54) HEATING ASSEMBLY FOR A CHROMATOGRAPHY SYSTEM

(71) Applicant: GL Sciences B.V., Eindhoven (NL)

(72) Inventor: Nikolay Gribov, Veldhoven (NL)

(73) Assignee: GL Sciences B.V., Eindhoven (NL)

( * ) Notice: Subject to any disclaimer, the term of this patent is extended or adjusted under 35 U.S.C. 154(b) by 362 days.

(21) Appl. No.: 18/289,414

(22) PCT Filed: Aug. 24, 2022

(86) PCT No.: PCT/NL2022/050486
§ 371 (c)(1),
(2) Date: Nov. 3, 2023

(87) PCT Pub. No.: WO2023/027585
PCT Pub. Date: Mar. 2, 2023

(65)          Prior Publication Data
     US 2024/0248067 A1     Jul. 25, 2024

(30)       Foreign Application Priority Data
   Aug. 25, 2021    (NL)  ..................................... 2029045

(51) Int. Cl.
    *B01D 53/02*      (2006.01)
    *B01D 8/00*       (2006.01)
             (Continued)

(52) U.S. Cl.
    CPC .............. *G01N 30/30* (2013.01); *B01D 8/00* (2013.01); *B01D 53/025* (2013.01); *G01N 2030/025* (2013.01)

(58) Field of Classification Search
    CPC .. B01D 53/025; B01D 8/00; G01N 2030/025; G01N 2030/3053; G01N 30/30
    See application file for complete search history.

(56)           References Cited

U.S. PATENT DOCUMENTS 4,992,083 A *   2/1991   Mueller .................... B01D 8/00
                                           96/101
5,235,186 A *   8/1993   Robins ............... G01N 30/7266
                                          250/281

(Continued)

FOREIGN PATENT DOCUMENTS

EP        1719958 A1    11/2006
GB       1188776 A     4/1970
GB       1232119 A     5/1971

OTHER PUBLICATIONS

International Search Report and Written Opinion—PCT/NL2022/050486—mailing date Mar. 2, 2023.

*Primary Examiner* — Christopher P Jones
(74) *Attorney, Agent, or Firm* — Banner & Witcoff, Ltd.

(57)              ABSTRACT

A heating assembly (100) for a chromatography system (1000) comprises primary and auxiliary heating tubes (110H, 120H) made of an electrically conductive material, and forming at least part of an inner and outer tube, respectively. The inner and outer tubes are mechanically and electrically interconnected. The primary and auxiliary heating tubes axially overlap at least along a subsection length (L) of the inner and outer tubes for transferring auxiliary heat from the auxiliary heating tube to the primary heating tube. The heating assembly comprises a pair of electrodes (130, 131), arranged for forming an electrical path (180) running in series through the primary and auxiliary heating tubes. The auxiliary heating tube comprises an extendible section (125) such as a bellows to axially extend or shorten for compensating any difference in thermally induced contraction or expansion, respectively, between the inner and outer tubes.

16 Claims, 6 Drawing Sheets

(51) Int. Cl.
    *G01N 30/30*     (2006.01)
    *G01N 30/02*     (2006.01)

(56)          References Cited

U.S. PATENT DOCUMENTS

| | | | |
|---|---|---|---|
| 2007/0107675 A1* | 5/2007 | Kurano | H05B 3/42 |
| | | | 122/408.1 |
| 2014/0332695 A1* | 11/2014 | McEwen | H01J 49/10 |
| | | | 250/423 R |
| 2015/0200083 A1* | 7/2015 | Brown | H01J 49/10 |
| | | | 250/288 |
| 2021/0112634 A1 | 4/2021 | Schlipf | |

\* cited by examiner

1000

1010

500

100

1100

500

1020

1200

100

HEATING ASSEMBLY FOR A CHROMATOGRAPHY SYSTEM

CROSS-REFERENCE TO RELATED APPLICATIONS

This application is a U.S. National Stage application under 35 U.S.C. § 371 of International Application PCT/NL2022/050486 (published as WO 2023/027585 A1), filed Aug. 24, 2022, which claims the benefit of priority to Application NL 2029045, filed Aug. 25, 2021. Benefit of the filing date of these prior applications is hereby claimed. Each of these prior applications is hereby incorporated by reference in its entirety.

TECHNICAL FIELD AND BACKGROUND

The present disclosure relates to a heating assembly. The disclosure further relates to a temperature controllable device including such heating assembly, e.g. to form an inlet or cold trap. The disclosure further relates to a chromatography system comprising such inlet and/or cold trap.

In a chromatography system, different types of devices can be used that may be rapidly heated to facilitate separation of analytes. Such devices may, e.g., include a sample introduction inlet or injector, a column oven, a heated transfer line, and a cold trap. For example, an external resistive heater or a hot air heater can be used for heating the device to a high temperature. External heaters can be attached to the device externally, for example by making physical contact between the heater and the device body to be heated. Due to a relatively high thermal mass of the heater and the device body, and the thermal resistance between the contacting surfaces, external resistive heaters may have high thermal inertia, and as a result, may have a slow heating and cooling rate.

EP1719958 describes a direct heating tube aimed at ensuring a uniform temperature distribution in the whole part thereof or a temperature distribution having a desired temperature gradient, and making it possible to keep constant the temperature of a fluid which is caused to flow through the tube or to give a desired change to the temperature of the fluid. Thereto, in a desired portion of the tube to be heated, a second heated tube connected to a first heated tube is provided outside the first heated tube, and an electrode portion is connected to the second heated tube.

A potential drawback of having a heater integrated in the device body is that a failure in one of these components may lead to the other component becoming unusable. Considering the normal operating conditions of these systems, which may e.g. include devices undergoing multiple cycles of being heated up to 1000° C. within a few seconds and cooled back to room temperature before receiving a next analyte, the effect of temperature on durability and reliability can be a limiting factor. Compared to systems in which a device is heated by an external heater, replacing or servicing of components may be more challenging in integrated solutions.

Accordingly there remains a desire to address these and other drawbacks, to further advance the field of gas chromatography, by providing a system for heating an analyte with improved reliability and durability.

SUMMARY

Aspects of the present disclosure relate to a heating assembly. The assembly comprises an inner tube with a primary heating tube made of electrically conductive material, and outer tube with an auxiliary heating tube made of (the same or another, preferably at least similar) electrically conductive material. The heating assembly comprises connection means (e.g. referred herein as flanges) which mechanically and electrically interconnect the inner tube with the outer tube. The primary and auxiliary heating tubes axially overlap at least along a subsection length of the inner and outer tubes for transferring auxiliary heat from the auxiliary heating tube to the primary heating tube over a radial gap between the inner and outer wall surfaces. For example, an electrical path is formed through the primary and auxiliary heating tubes via the electrically conductive material.

By providing an electrically insulating section parts of the electrically conductive material can be electrically separated while maintaining a mechanical connection. By separating parts of the outer tube between the flanges and connecting electrodes on either sides of the insulating section, the electrical path can be directed to exclusively pass in series through respective parts of both the primary and auxiliary heating tubes. Advantageously, this may ensure the same current runs through both heating tubes.

By providing an extendible section in at least one of the tubes the tubes may be allowed to axially extend or shorten for compensating any difference in thermally induced contraction or expansion, respectively, between the inner tube and the outer tube. By providing the extendible section in the outer tube, the inner tube may be relatively unaffected. Accordingly, while ensuring a uniform temperature distribution along the length of the primary heating tube during heating of the heating assembly, internal thermal expansion differences, e.g. caused by cyclic thermal loading, can be compensated by the extendible section in a controlled fashion, to avoid that these thermal expansion differences lead to stresses in undesired locations within the heating assembly. As such, deformation and misalignment of components, such as sensors or couplings, can be minimalized, while structural damage due to thermal expansion can be reduced, to improve the reliability and durability of the heating assembly.

When the extendible section is part of the auxiliary heating tube, it can be arranged for generating and transferring auxiliary heat from said part of the auxiliary heating tube to the primary heating tube. As such, the extendible section can also be used to generate and transfer auxiliary heat to the primary heating tube, e.g. to heat sections of the primary heating tube that are connected to a relatively large thermal mass. As a result, the function of providing auxiliary heat as well as the function of compensating for thermal expansion can synergistically be integrated in the extendible section, to provide a heating assembly with a uniform temperature distribution, while avoiding damage due to cyclic thermal loading of the heating assembly.

By having the extendible section configured to axially extend or shorten by elastic and/or reversible deformation thereof, the number of load cycles, e.g. elastic deformation cycles, that the extendible section can endure before the extendible section is damaged by mechanical fatigue can be significantly increased, e.g. compared to plastic deformation of the extendible section.

In a particularly advantageous embodiment, the extendible section comprises a foldable structure, most preferably a bellows. A bellows is generally understood as an expandable object or device, e.g. having concertinaed sides to allow it to expand and contract. Typically, the bellows is formed by an axially corrugated tube comprising a series of at least two corrugations (undulations, convolutions), preferably at least three, five, e.g. up to twenty or more. For example, the corrugations have corrugation amplitudes arranged in radial direction of the auxiliary heating tube and corrugation pitches arranged in axial direction of the auxiliary heating tube. In this way a relative high degree of resilience of the extendible section can be provided, e.g. combined with a relatively low degree of stiffness of the extendible section, along the axial direction of the inner and outer tubes, thereby allowing (elastic and/or reversible) deformation of the extendible section to compensate any thermal expansion differences between the inner and outer tubes.

By having a uniform corrugation amplitude of the series of corrugations, the stiffness and resilience characteristics of the extendible section can be constant along the axial length of the extendible section. As a result, elastic deformation of the extendible section, to compensate thermal expansion differences between the inner and outer tubes, can be evenly distributed along the axial length of the extendible section, to minimize fatigue. Alternatively or additionally, the stiffness and resilience characteristics of the extendible section can be made constant along the axial length of the extendible section by having a uniform corrugation pitch of the series of corrugations. As such, elastic deformation of the extendible section can be evenly distributed along the axial length of extendible section, to minimize fatigue.

By having the series of corrugations form part of the electrical path through the primary and auxiliary heating tubes, the series of corrugations can be used to generate and transfer auxiliary heat to the primary heating tube. As a result, the series of corrugations provide a synergetic combination of the function of providing auxiliary heat and the function of compensating for thermal expansion, integrated in the extendible section, to provide a heating assembly with a uniform temperature distribution, that can avoid damage to the heating assembly due to cyclic thermal loading.

To match the electrical resistivity of the extendible section with the electrical resistivity of the primary heating tube, e.g. to have approximately similar heating characteristics of the extendible section and the primary heating tube, the primary heating tube can have a first wall thickness, the extendible section can have a second wall thickness, and the second wall thickness can be the same or similar as the first wall thickness, e.g. within factor two. To further match the electrical resistivity of the extendible section with the electrical resistivity of the primary heating tube, e.g. these are preferably made of the same conductive material. Advantageously, by using identical materials, the thermal expansion of the extendible section can also be better matched with the thermal expansion of the primary heating tube, to reduce the axial extension and shortening of the extendible section required for compensating a thermal expansion difference between the inner and outer tubes.

To minimize damage or deformation of the primary heating tube, e.g. due to cyclic thermal loading, the extendible section, forming part of auxiliary heating tube, can be designed having an axial stiffness lower than that of the primary heating tube, e.g. by at least a factor two. As such, axial thermal expansion differences between inner tube, comprising primary heating tube, and outer tube, comprising extendible section, are more likely to be compensated by extendible section, thereby minimizing stresses in other parts.

By having the extendible section arranged for providing a sealed environment between the inner tube and the outer tube, the sealed environment can provide a synergetic advantage in that it can additionally or alternatively be used for receiving coolant medium inside the heating assembly, e.g. along a cooling path that passes though radial gap past the inner surface of the auxiliary heating tube and past the outer surface of the primary heating tube, to cool these heating tubes. Alternatively, or additionally, a cooling circuit can be arranged to flow in the radial gap between the primary or auxiliary heating tubes. As will be appreciated this can provide an advantageous heating/cooling arrangement, also without the extendible section.

Other aspects or further aspects relate to a temperature controllable device comprising the heating assembly as described herein, e.g. with its temperature controlled based on sensor input. Preferably, the temperature sensor is arranged for measuring a temperature of the primary heating tube. For example, the temperature sensor can be used for determining the temperature of the heating assembly and/or an analyte heated by the heating assembly (inside the primary heating tube). An an electric current passing through the electrical path can be controlled based on measurements from the temperature sensor, e.g. with a closed loop temperature control of the device to follow a specific heating profile.

In some embodiments, the device may comprise a cooling circuit, arranged for cooling the inner and outer tubes. As such, cooling of the device, e.g. from a heated temperature back to room temperature or to a lower temperature, can be performed more rapidly compared to conventional heating devices. For example when device is used as an inlet, this may reduce the time between injection of samples into a gas chromatography system, thereby increasing throughput. For example when device is used as a cold trap, this may increase the rate of cooling of the analyte.

By having the cooling circuit arranged for allowing cooling medium to flow through the radial gap between the inner and outer wall surfaces of the auxiliary and primary heating tubes, respectively, cooling medium can flow past and come into contact with the inner and outer wall surfaces of the auxiliary and primary heating tubes, respectively, to simultaneously cool the auxiliary and primary heating tubes, to increase the cooling rate of the device.

When the device forms an inlet for a gas chromatography system, the inlet can have improved reliability and durability by comprising a heating assembly with an extendible section arranged for compensating internal thermal expansion differences, e.g. caused by cyclic thermal loading of inlet, while ensuring a uniform temperature distribution during heating of a sample.

When the device forms a cold trap for a gas chromatography system, a uniform temperature distribution can be ensured during heating of a sample after cryogenic trapping of the sample by the device comprising a heating assembly as described herein, while having improved reliability and durability by compensating internal thermal expansion differences, e.g. caused by cyclic thermal loading.

Further aspects relate to a chromatography system comprising the heating assembly and/or the device as described herein. Accordingly, while ensuring uniform temperature distribution during heating and/or reheating of samples, the chromatography system can have improved reliability and durability by comprising one or more heating assemblies and/or devices with one or more expansion mechanisms arranged for compensating internal thermal expansion differences, e.g. caused by cyclic thermal loading.

Yet further aspects relate to specific use of the heating assembly and/or the device as described herein, e.g. as an inlet and/or a cold trap or other part of a chromatography system. This may provide similar and/or further advantages as noted herein.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Figure 1:
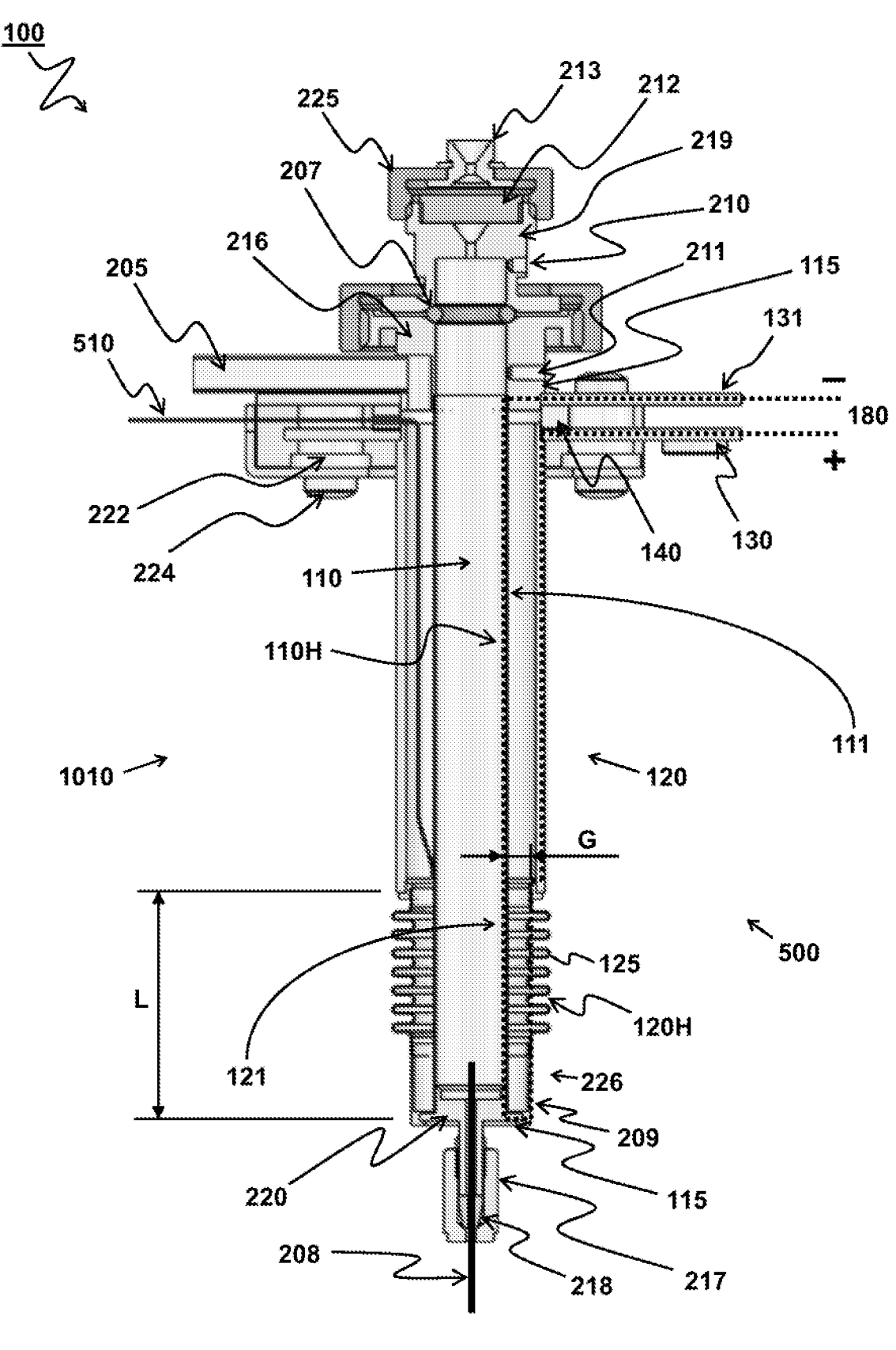
FIG. 1 illustrates a cross-section view of a heating assembly as part of an inlet.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout.

Figure 2:
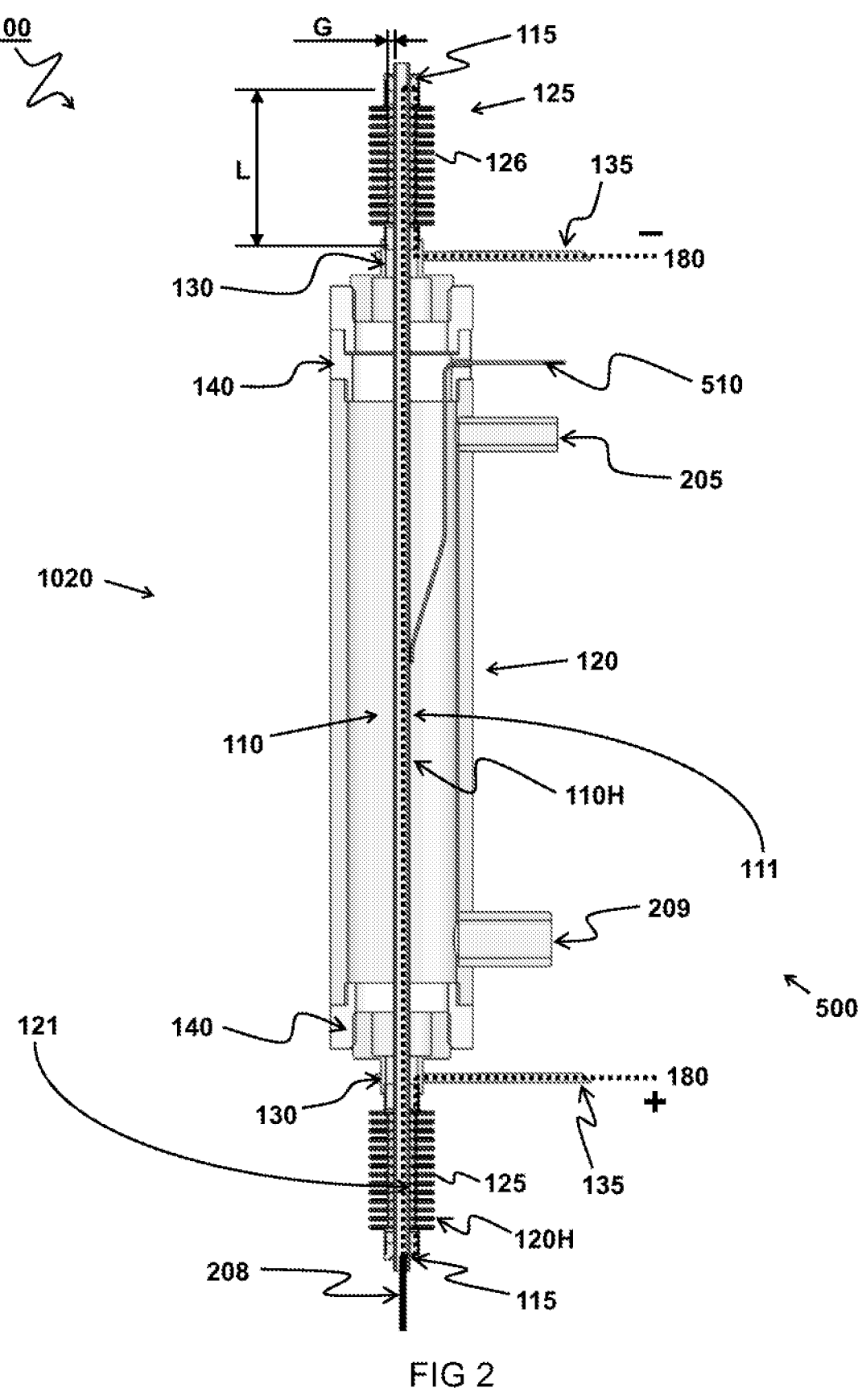
FIG. 2 illustrates a cross-section view of a heating assembly as part of a cold trap.

FIG. 1 illustrates an embodiment of a heating assembly 100, e.g. an inlet for a gas chromatograph, while FIG. 2 illustrates another or further embodiment of a heating assembly 100, e.g. a cold trap for a gas chromatograph. The heating assembly 100 comprises a primary heating tube 110H, made of an electrically conductive material and forming at least part of an inner tube 110, and an auxiliary heating tube 120H, made of the same or another electrically conductive material and forming at least part of an outer tube 120. Preferably, the conductive materials are the same or similar, e.g. at least having similar thermal expansion coefficient within. ±5%. Suitable electrically conductive materials for the primary heating tube 110H and/or the auxiliary heating tube 120H may, e.g., be dependent on the specific temperature ranges at which the heating assembly 100 is intended to be used. For example, suitable electrically conductive materials may include materials having a melting point higher than a maximum heating temperature of the primary and/or auxiliary heating tubes 110H, 120H, e.g. at least 600 degrees Celsius, preferably at least 1000 degrees Celsius. Preferred materials may, for example, include (at least partially conductive) metals or alloys, such as (possibly different) stainless steels, nickel, and/or other hard metal alloys. Alternatively, or in addition, refractory metals, including the wider definition of refractory metals, and their alloys can be suitable materials for their relatively high resistivity to heat and wear. Alternatively, or additionally, electrically conductive ceramics or electrically conductive plastics can be used in some applications of a heating assembly 100 as described herein.

In some embodiments, the heating assembly further comprises a pair of flanges 115 which mechanically and electrically interconnect the inner tube 110 with the outer tube 120 (e.g. a pair of rings, washers, or other conductive pieces, radially interconnecting respective mid and/or end sections of the tubes), wherein the inner and outer tubes 110, 120 extend between the flanges with the inner tube 110 arranged inside the outer tube 120, wherein the primary and auxiliary heating tubes 110H, 120H axially overlap at least along a subsection length L of the inner and outer tubes 110,120, respectively, between the flanges. For example, the inner and outer tubes 110, 120 can have axial lengths ranging between 50 millimeter and 150 millimeter. Dimensions may depend on the type of application of the heating assembly 100, e.g. depending on the size of a liner comprising a sample to be heated by the heating assembly 100, or a column outside diameter. The length and wall thickness of the inner tube 110 and/or outer tube 120 may vary while the primary and auxiliary heating tubes 110H, 120H preferably have a relatively high resistance, to facilitate Ohmic heating. As such, the primary and auxiliary heating tubes 110H, 120H preferably have a relatively thin wall thickness, e.g. selected in a range between 0.05-1 millimeter, preferably between 0.1 millimeter and 0.2 millimeter. Alternatively, or additionally, the (overlapping) subsection length L is preferably selected in a range between 10-80 millimeter, or in a range between 20-50 millimeter. For example, values in these range may be selected as an ideal compromise between mechanical strength and electrical resistance.

The subsection length L between the auxiliary primary and auxiliary heating tubes 110H, 120H may, in principle, span the full axial length of primary heating tube 110H, although it is preferred to span only part thereof, e.g. between 10-90% of the total length between the flanges 115. The auxiliary heating tube 120H and the primary heating tube 110H can for example overlap such that axial ends of the auxiliary heating tube 120H and the primary heating tube 110H are aligned on a plane, or the auxiliary heating tube 120H can overlap the primary heating tube 110H, such that there is an offset between axial ends of the primary heating tube 110H and the auxiliary heating tube 120H.

In some embodiments, along the subsection length L, an inner wall surface 121 of the auxiliary heating tube 120H faces an outer wall surface 111 of the primary heating tube 110H. Accordingly, auxiliary heat can be transferred from the auxiliary heating tube 120H to the primary heating tube 110H over a radial gap G between the inner and outer wall surfaces 121, 111. For example the auxiliary heat may be transferred from the auxiliary heating tube 120H to the primary heating tube 110H across the radial gap G by radiation and/or convection. At the same time, the radial gap G may electrically isolate the inner and outer wall surfaces 121, 111 from each other. As such, the radial gap G between the inner and outer wall surfaces 121, 111 (along the subsection length L) is preferably selected in a range between 1-10 millimeter, more preferably between 2-6 millimeter.

In other or further embodiments, the heating assembly further comprises a pair of electrodes 130, 131, connected to respective parts of the electrically conductive material and arranged for forming an electrical path 180 through the primary and auxiliary heating tubes 110H, 120H via the electrically conductive material. Electrodes can e.g. be made of metal or other electrically conductive material, and connected via wiring to an electric power source, such as an AC or DC power source. The outer tube 120 can comprise an electrically insulating section 140 arranged for mechanically connecting, while electrically separating (isolating), parts of the electrically conductive material. As such, the electrical path 180 passes exclusively in series through respective parts of both the primary and auxiliary heating tubes 110H, 120H. For example, a ceramic or a high temperature plastic ring 140 can be placed between upper 131 and lower 130 electrodes to provide the electrical isolation between them. To create a mechanically stable construction, primary heating tube 110H and auxiliary heating tube 120H may be mounted in one assembly using ceramic or high temperature plastic washers 222, and screws 224. Preferably, all parts used in and around the electrically insulating section 140 have a sufficiently high (continuous) operating or working temperature, e.g. at least 300 degrees Celsius, most preferably at least 500 degrees Celsius. To achieve this, typically the melting temperature should be at least twice higher. For example, the melting temperature is at least 600 degrees Celsius, preferably at least 1000 degrees Celsius.

In some embodiments, the auxiliary heating tube 120H comprises an extendible section 125, configured to axially extend or shorten for compensating any difference in thermally induced contraction or expansion, respectively, between the inner tube 110 and the outer tube 120. Preferably, the extendible section 125 comprise a foldable structure, most preferably a closed foldable structure such as a bellows. Also other or further foldable structures can be envisages such as a leaf springs, membranes, corrugated elements, split joints, helical or coil springs, Belleville washers, or other mechanism for compensating a thermal expansion difference, e.g. an axial and/or radial expansion difference, between inner tube 110 and outer tube 120. Depending on the application, the heating assembly 100 may benefit from very rapid heating and/or cooling, e.g. heating up with a rate ranging between 1-150 degrees (Celsius or Kelvin) per second, preferably at least 50 degrees per second, with corresponding electrical currents, e.g., between 10-100 Ampere passing through the primary and auxiliary heating tubes 110H, 120H. For such extreme conditions, thermal fatigue, e.g. causing failure with macroscopic cracks resulting from cyclic thermal stresses and strains due to temperature changes, spatial temperature gradients, and high temperatures under constrained thermal deformation, may be a significant factor determining the lifespan and reliability of the heating assembly 100. In some preferred embodiments, including the extendible section 125 as described, thermal and/or other stresses in the heating assembly 100 may be alleviated, e.g. compensating expansion differences between the inner and outer tubes 110,120 to improve lifespan and/or reliability. Synergistically, by the extendible section 125 being a part of the auxiliary heating tube 120H, the extendible section 125 can provide a uniform temperature distribution along the primary heating tube 110H during heating, while improving the durability and reliability of the heating assembly 100.

In some embodiments, e.g. as shown in FIGS. 1 and 2, the extendible section 125, as part of the auxiliary heating tube 120H, can be arranged for generating and transferring auxiliary heat from said part of the auxiliary heating tube 120H to the primary heating tube 110H. For example, the extendible section 125 can be arranged for generating auxiliary heat, e.g. by ohmic heating caused by electrical path 180 passing through the extendible section 125, and for transferring auxiliary heat to primary heating tube 110H, e.g. by radiation or convection along radial gap G. As such, the extendible section 125 can also be used to generate and transfer auxiliary heat to primary heating tube 110H, e.g. to heat sections of primary heating tube 110H that are connected to a relatively large thermal mass. As a result, the function of providing auxiliary heat as well as the function of compensating for thermal expansion can synergistically be integrated in extendible section 125, to provide a heating assembly 100 with a uniform temperature distribution, while avoiding damage due to cyclic thermal loading of heating assembly 100.

In other or further embodiments, the extendible section 125 can be configured to axially extend or shorten by elastic deformation thereof. For example, the extendible section 125 can be an elastic element, e.g. designed with specific material and/or geometric properties to provide a relatively high degree of resilience in one or more directions. In other words, in one or more directions the extendible section 125 can have a relatively low stiffness combined with a relatively high yield strength. For example, the extendible section 125 can have a relatively high degree of resilience along the axial direction of primary and auxiliary heating tubes 110H, 120H, to compensate any thermal expansion differences present in axial direction between inner and outer tubes 110, 120 by elastic deformation of the extendible section 125. For example, the extendible section 125 can be configured to axially extend or shorten at least between a factor 0.9-1.1 times its original (unloaded) length by elastic deformation of the extendible section 125, preferably at least between a factor 0.8-1.2. As such, the number of load cycles, e.g. elastic deformation cycles, that the extendible section 125 can endure before the extendible section 125 is damaged by mechanical fatigue, e.g. metal fatigue, can be increased compared to when the extendible section 125 is configured to compensate the thermal expansion difference by plastic deformation of the extendible section 125. Accordingly, extendible section 125 can be arranged for compensating the thermal expansion difference between the inner and outer tubes 110, 120 by being an elastically deformable structure, e.g. an elastically foldable structure, such as a foldable plate or tube structure, e.g. a bellows. A foldable structure can for example be arranged for extending and shortening along the axial direction of extendible section 125, to compensate for thermal expansion differences between inner and outer tubes 110, 120 in an axial direction. Alternatively, extendible section 125 can comprise a corrugated membrane, or a split joint, having sliding members. A split joint, however, may in some embodiments need a seal between sliding members, which can cause additional wear and/or damage.

In some further embodiments, the extendible section 125 is configured to elastically deform along the axial direction of the auxiliary heating tube 120H by at least 0.5 millimeter, preferably by at least 0.8 millimeter, and more preferably by at least 1.0 millimeter. For example, extendible section 125 can be configured to elastically deform along the axial direction of the auxiliary heating tube 120H between 0.5 millimeter and 2.0 millimeter, e.g. depending on the total length, operating temperatures, and electrically conductive materials of the heating assembly 100. As a result, the extendible section 125 can compensate thermal expansion differences, in the axial direction of auxiliary heating tube 120H, between the inner tube 110 and the outer tube 120 of at least 0.5 millimeter, e.g. to avoid fatigue in components of heating assembly 100 under cyclic thermal loading. Calculations show that, for instance, an about 100 millimeter long primary heating tube 110H made out of a stainless steel may elongate approximately 1.2 mm when being heated from room temperature to 800 degrees Celsius. In case the axial ends of inner tube 110 and outer tube 120 are restricted, such elongation may cause significant internal stress that can lead to damage of heating assembly 100 after a number of thermal cycles. By having the extendible section 125 configured to elastically deform along the axial direction of the auxiliary heating tube 120H by at least 0.5 millimeter, e.g. between 1.0 millimeter and 2.0 millimeter, stresses due to thermal expansion of heating assembly 100 can be relieved by the extendible section 125. By having the deformation of the extendible section 125 in an elastic deformation range, i.e. with stresses in the extendible section 125 below the yield strength of the extendible section 125, the number and frequency of thermal load cycles can be increased compared to having the deformation of the extendible section 125 in a plastic deformation range, i.e. with stresses in the extendible section 125 beyond the yield strength of the extendible section 125. For example, the extendible section 125 can be arranged for elastically deforming along the axial direction of the auxiliary heating tube 120H by at least 0.5 millimeter, and for at least 1000 thermal load cycles in which the heating assembly 100 is heated from room temperature to approximately 800 degrees Celsius within about 10 seconds, and then cooled back to room temperature.

Figure 3A:
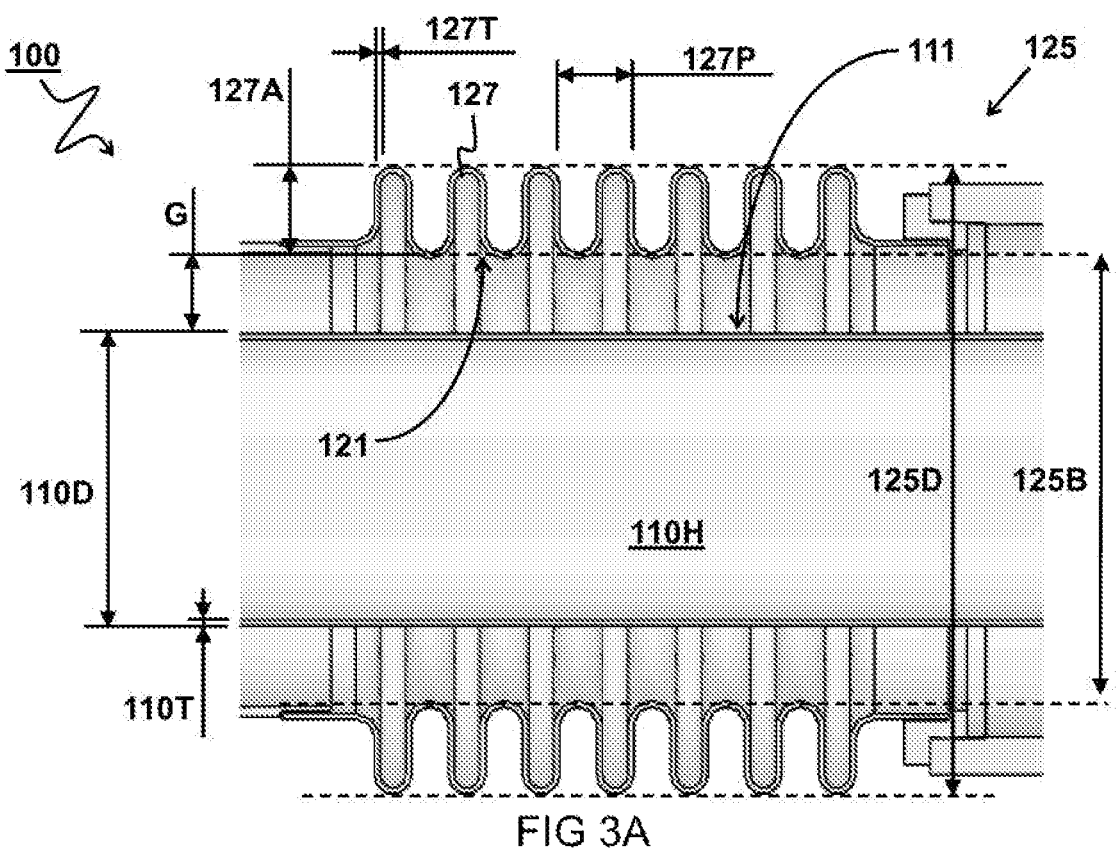
FIGS. 3A and 3B illustrate a respective cross-section views of an extendible section in a heating assembly.
Figure 3B:
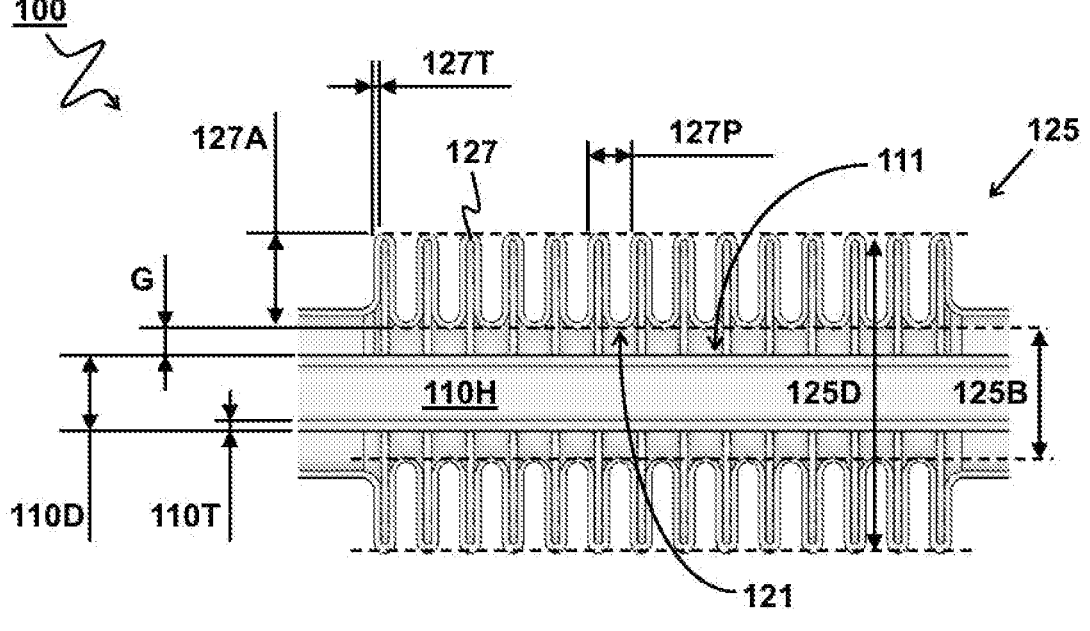

FIGS. 3A and 3B illustrate cross-section views of embodiments of the extendible section 125. In some embodiments, e.g. as shown, the extendible section 125 comprises a bellows formed by an axially corrugated tube, comprising a series of corrugations 127 having corrugation amplitudes 127A arranged in radial direction of the auxiliary heating tube 120H and corrugation pitches 127P arranged in axial direction of the auxiliary heating tube 120H. By having a series of corrugations, a bellows is advantageously able to compensate for expansion differences between the inner tube 110 and the outer tube 120 in an axial direction as well as in a radial direction, lateral to the axial direction. A bellows may also be able to compensate for slight misalignments or angular offsets between the inner tube 110 and the outer tube 120, that could otherwise result in internal stresses in the heating assembly 100 introduced during assembly of the heating assembly 100 or during thermal loading of the heating assembly 100. As such, using a bellows may further reduce internal stresses in the heating assembly 100, thereby improving the reliability and durability of heating assembly 100. For example, the extendible section 125 can comprise a bellows formed by a tube comprising a plurality of corrugations, e.g. two or more corrugations, between five and twenty corrugations, up to thirty corrugations, or more, depending on the total length of extendible section 125. For example, the bellows can comprise five corrugations, seven corrugations, ten corrugations, fourteen corrugations, twenty corrugations, or twenty four corrugations. The bellows can for example be made of an electrically conductive material, such as stainless steel or other hard metal alloy, for the bellows to also work as an auxiliary heating tube. Bellows dimensions can be restricted by the size of the primary heating tube 110H to create a good auxiliary heating solution.

The corrugation amplitude 127A extends in a radial direction, e.g. between an inner diameter of extendible section 125 and an outer diameter of extendible section 125.

For example, for a bellows having an inner diameter of 9.5 millimeter and an outer diameter of 15.0 millimeter, corrugation amplitude 127A is equal to 2.75 millimeter. As another example, for a bellows having an inner diameter of 3.0 millimeter and an outer diameter of 6.0 millimeter, corrugation amplitude 127A is equal to 1.5 millimeter. The corrugation pitch 127P extends in an axial direction, e.g. forming at least part of the axial length of extendible section 125. For example, for a bellows having seven corrugations spanning a corrugated axial length of 14.0 millimeter, corrugation pitch 127P is equal to 2.0 millimeter. As another example, for a bellows having fourteen corrugations spanning a corrugated axial length of 11.2 millimeter, corrugation pitch 127P is equal to 0.8 millimeter.

The series of corrugations can for example be single-sided, e.g. having corrugations 127 either all extending radially inward or all extending radially outward. Alternatively, the series of corrugations can be double-sided, e.g. having corrugations 127 extending radially inward as well as outward. While having a corrugation amplitude in the radial direction and a corrugation pitch in the axial direction, corrugations can for example comprise sharp edges in the wall of the tube, such as folds, creases, or plies. Alternatively, corrugations can comprise rounded edges in the wall of the tube, such as waves, undulations, or indents. In bellows, corrugations can sometimes also be referred to as convolutions. As such, an axially corrugated tube can provide a relative high degree of resilience of the extendible section 125, e.g. combined with a relatively low degree of stiffness of the extendible section 125, along the axial direction of the inner and outer tubes, thereby allowing elastic deformation of the extendible section 125 to compensate any thermal expansion differences between the inner tube 110 and the outer tube 120.

Buckling, or squirming, of the extendible section 125 may occur under compressive loading of the extendible section 125, e.g. when the extendible section 125 is shortened to compensate for an axial expansion difference between the inner tube 110 and the outer tube 120. Buckling may be a result of a relatively low lateral stiffness of the extendible section 125, e.g. caused by a relatively long and slender extendible section 125, in combination with a lateral load on the extendible section 125, e.g. due to small assembly misalignments of the extendible section 125 or due to the own weight of the extendible section 125 under specific orientations with respect to gravity. Buckling may cause a number of corrugations to shift laterally away from the axial centerline of the outer tube 110, thereby potentially short circuiting and/or damaging the heating assembly 100. To avoid buckling while allowing the extendible section 125 to compensate thermal expansion differences between the inner tube 110 and the outer tube 120, and while allowing transfer of auxiliary heat from the auxiliary heating tube 120H to the primary heating tube 110H, a design of the extendible section 125 may include optimization for the number of corrugations of the extendible section 125, the inner and outer diameter of the extendible section 125, the wall thickness of the extendible section 125 and/or the total length of the extendible section 125.

In some further embodiments, the series of corrugations 127 have a uniform corrugation amplitude 127A. For example, the series of corrugations 127 have a uniform corrugation amplitude 127A along the axial length of the extendible section 125, such that the corrugation amplitude 127A runs between lines parallel to the centerline of the extendible section 125 on the inside and on the outside of the extendible section 125. A uniform corrugation amplitude can e.g. be uniform along the axial length of the extendible section 125 within 10%, preferably within 1%. For example, each corrugation of the series of corrugations 127 can comprise a uniform corrugation amplitude 127A, which is uniform along the axial length of the extendible section 125, between about 1 millimeter and 4 millimeter, or between about 2 millimeter and 3 millimeter. Accordingly, the stiffness and resilience characteristics of the extendible section 125 can be constant along the axial length of the extendible section 125. As a result, elastic deformation of the extendible section 125, to compensate thermal expansion differences between the inner tube 110 and the outer tube 120, can be evenly distributed along the axial length of the extendible section 125, to minimize fatigue.

Additionally, or alternatively, the series of corrugations 127 have a uniform corrugation pitch 127P. For example, each corrugation of the series of corrugations 127 can comprise a uniform corrugation pitch 127P, which is uniform along the axial length of the extendible section 127, equal to 2.0 millimeter. Similarly, each corrugation 127 can comprise a uniform corrugation amplitude 127P equal to e.g. 0.8 millimeter or 1.4 millimeter. Accordingly, the stiffness and resilience characteristics of the extendible section 125 can be constant along the axial length of the extendible section 125. As a result, elastic deformation of the extendible section 125, can be evenly distributed along the axial length of the extendible section 125, to further minimize fatigue.

In some embodiments, the series of corrugations 127 form part of the electrical path 180 through the primary and auxiliary heating tubes 110H, 120H. For example, the electrical path 180 may axially pass through the series of corrugations 127, thereby following the convoluted shape of the wall of the bellows. As such, the series of corrugations 127 are arranged for conducting current passing along the extendible section 125 of the auxiliary heating tube 120. As such, the series of corrugations 127 can be used to generate and transfer auxiliary heat to the primary heating tube 110H. As a result, the series of corrugations 127 provide a synergetic combination of the function of providing auxiliary heat and the function of compensating for thermal expansion, integrated in extendible section 125, to provide a heating assembly 100 with a uniform temperature distribution, that can avoid damage to heating assembly 100 due to cyclic thermal loading.

In other or further embodiments, e.g. as shown in FIGS. 3A and 3B, the primary heating tube 110H has a first wall thickness 110T, wherein the extendible section 125 has a second wall thickness 125T, and wherein the second wall thickness 125T is the same or similar as the first wall thickness 110T, e.g. within a ratio between 0.5-2, preferably between 0.7 and 1.4. For example, for the primary heating tube 110H shown in FIG. 3B the first wall thickness 110T is about 0.20 millimeter, and the second wall thickness 125T of the extendible section 125 is about 0.14 millimeter. As another example, for the primary heating tube 110H shown in FIG. 3A, the first wall thickness 110T is about 0.15 millimeter, and the second wall thickness 125T of the extendible section 125 is about 0.15 millimeter. Accordingly, the electrical resistivity of the extendible section 125 can be matched with the electrical resistivity of primary heating tube 110H, e.g. to have approximately similar heating characteristics of extendible section 125 and primary heating tube 110H.

In some embodiments, the primary heating tube 110H is made of a first electrically conductive material, the extendible section 125 is made of a second electrically conductive material, and the second electrically conductive material is identical to the first electrically conductive material. For example, the primary heating tube 110H can be made of a stainless steel, and the extendible section 125 can be made of an identical stainless steel. As another example, the primary heating tube 110H can be made of a refractory metal, and the extendible section 125 can be made of an identical refractory metal. Accordingly, the electrical resistivity of the extendible section 125 can be further matched with the electrical resistivity of the primary heating tube 110H, e.g. to have approximately similar heating characteristics of the extendible section 125 and the primary heating tube 110H. Also, by using identical materials, the thermal expansion of the extendible section 125 can be matched with the thermal expansion of the primary heating tube 110H, to reduce the axial extension and shortening of the extendible section 125, e.g. used for compensating a thermal expansion difference between the inner tube 110 and the outer tube 120.

In some embodiments, for example as shown in FIGS. 3A and 3B, the extendible section 125 has an inner diameter 125B, and the inner diameter 125B defines at least part of the radial gap G between the inner and outer wall surfaces 121, 111 of the auxiliary and primary heating tubes 120H, 110H, respectively. In other words, the extendible section 125 may e.g. have an inner wall surface that at least partially defines the inner wall surface 111 of auxiliary heating tube 120H. For example, as shown in FIGS. 3A and 3B, the inner diameter 125B can be defined as the smallest distance between corrugations 127 on opposing sides of the center line of the extendible section 125. As a result, transfer of auxiliary heat from the extendible section 125 to the primary heating tube 110H, e.g. by radiation and/or convection, can be defined by the inner diameter of the extendible section 125 relative to the outer diameter of the primary heating tube 110H.

As also shown in FIGS. 3A and 3B, in some embodiments, the primary heating tube 110H can have a first outer diameter 110D, the extendible section 125 can have a second outer diameter 125D, and wherein the second diameter 125D is between a factor 2 and 5 larger than the first diameter 110D. For example, the second outer diameter 125D of the extendible section 125 can be more than a factor 2 larger than the first outer diameter 110D of the primary heating tube 110H, e.g. such that the radial gap G between the extendible section 125 and the primary heating tube 110H provides electric insulation between the extendible section 125 and the primary heating tube 110H. For example, the second outer diameter 125D of the extendible section 125 can be less than a factor 5 larger than the first outer diameter 110D of the primary heating tube 110H, e.g. such that the radial gap G between the extendible section 125 and the primary heating tube 110H allows transfer of auxiliary heat from the extendible section 125 to the primary heating tube 110H, e.g. by radiation and/or convection. For example, the second outer diameter 125D of the extendible section 125 can be between a factor 2 and 5 larger than the first outer diameter 110D of the primary heating tube 110H, e.g. to allow passing of cooling medium through the radial gap G between the extendible section 125 and the primary heating tube 110H to cool the extendible section 125, the auxiliary heating tube 120H correspondingly, and/or the primary heating tube 110H. As such, the second outer diameter 125D of the extendible section 125 can for example be dependent on the first outer diameter 110D of the primary heating tube 110H, e.g. to limit the size of the heating assembly 100. The second outer diameter 125D is defined as the largest distance between opposing corrugations, measured along the radial direction of the extendible section 125, perpendicular to the axial direction of the extendible section 125.

In other or further embodiments, the inner tube 110 has a first axial stiffness, the extendible section 125 has a second axial stiffness, and the second axial stiffness is less than fifty percent of the first axial stiffness, e.g. down ten percent or even lower. Because of their ohmic heating function, the primary and auxiliary heating tubes 110H, 120H may be designed as relatively thin walled compared to other components of the heating assembly 100, while also forming structural elements. As such, the primary and auxiliary heating tubes 100H, 120H can be regarded as the structurally most delicate parts of the heating assembly 100. To minimize damage or deformation of the primary heating tube 110H, e.g. due to cyclic thermal loading, the extendible section 125, forming part of the auxiliary heating tube 120H, can be designed having a second axial stiffness lower than a first axial stiffness of the primary heating tube 110H. As such, axial thermal expansion differences between the inner tube 110, comprising the primary heating tube 110H, and the outer tube 120, comprising the extendible section 125, are more likely to be compensated by the extendible section 125, thereby minimizing stresses in the primary heating tube 110H.

In yet other or further embodiments, the extendible section 125 is arranged for providing a sealed environment between the inner tube 110 and the outer tube 120. For example, the extendible section 125 can be a tube-like structure that is axially connected e.g. welded, brazed, or pressed, to another part of the outer tube 120 around the circumference, to provide a sealed environment between inner tube 110 and outer tube 120. Accordingly, the sealed environment can for example be used for receiving coolant medium inside the heating assembly 100, e.g. along a cooling path that passes though the radial gap G past the inner surface 121 of the auxiliary heating tube 120H and past the outer surface 111 of the primary heating tube 110H, for example to cool these heating tubes 110H, 120H.

Figure 4A:
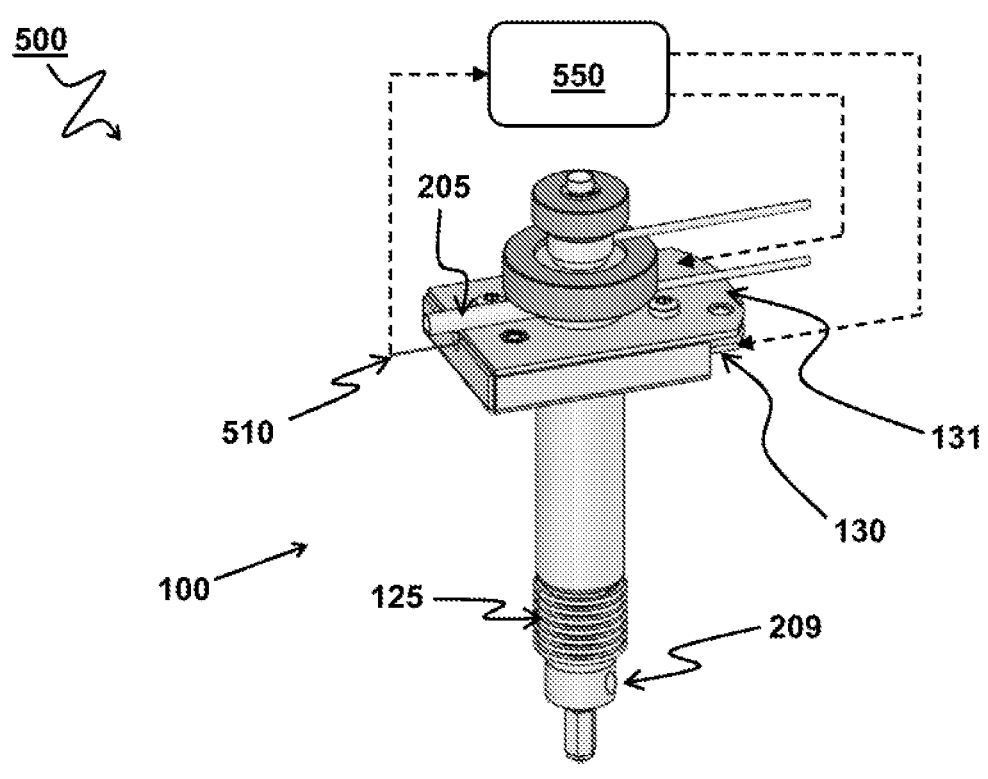
FIGS. 4A and 4B illustrate further aspects of the inlet.
Figure 4B:
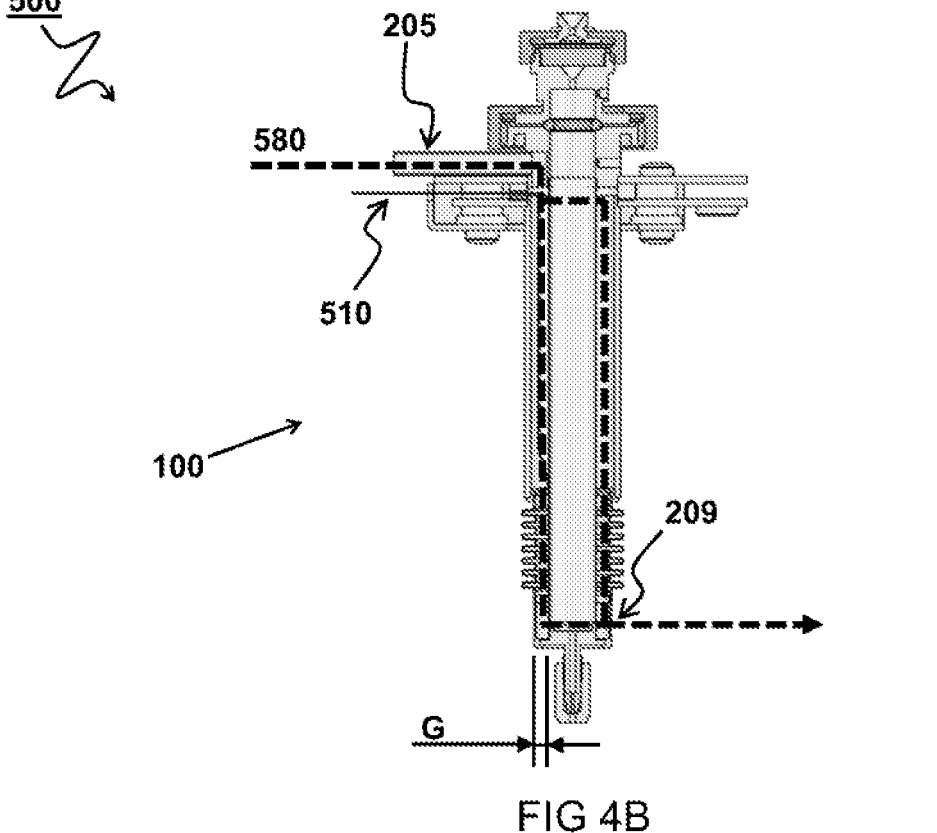
Figure 5A:
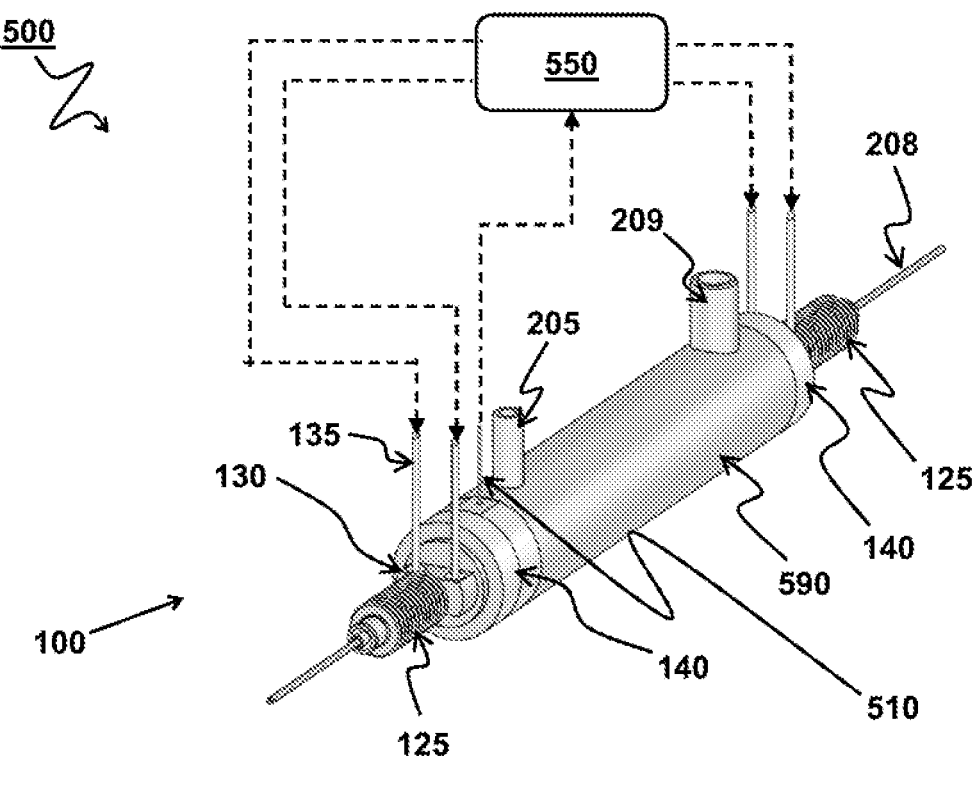
FIGS. 5A and 5B illustrate further aspects of the cold trap.
Figure 5B:
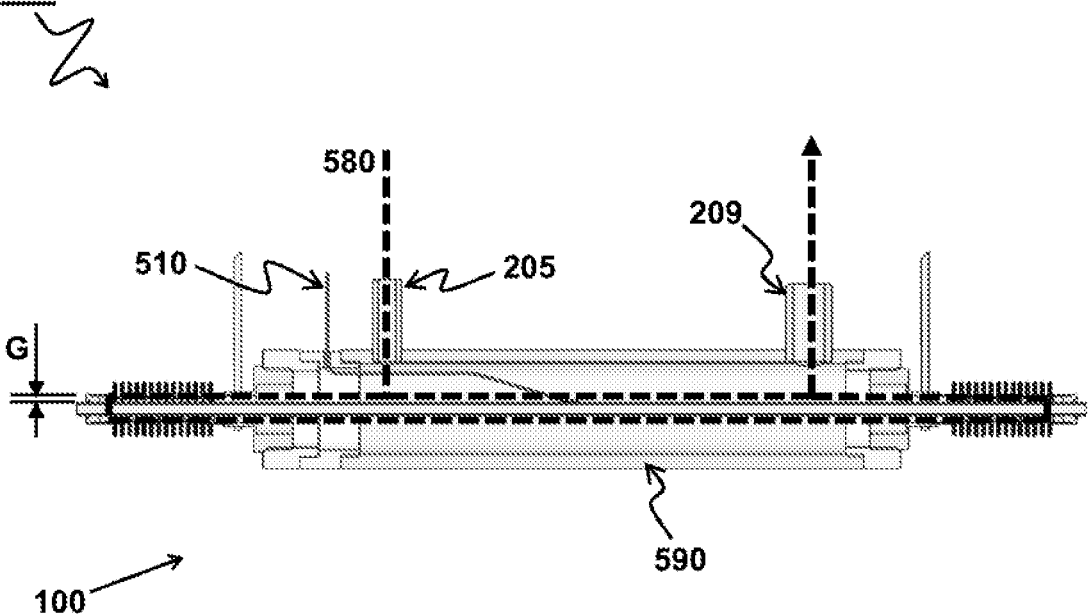

FIGS. 4A and 4B illustrate a device 500, e.g. an inlet for a gas chromatograph, and FIGS. 5A and 5B illustrate another device 500, e.g. a cold trap for a gas chromatograph, comprising the heating assembly 100 described herein. For example, when the device 500 is an inlet for injection of an analyte into a gas chromatography system, the heating assembly 100 can e.g. be arranged for heating the analyte before or during injection. As another example, when the device 500 is a cold trap—sometimes referred to as a cryogenic trap—in which an analyte in the column of a gas chromatography system is first cooled and then rapidly heated to narrow the chromatographic band an improve the detection limit, the heating assembly 100 can e.g. be arranged for heating the analyte. Other types of devices 500 comprising the heating assembly 100, e.g. in the field of chromatography, can be envisioned by the person skilled in the art. Accordingly, the reliability and durability of the device 500 can be improved by comprising the heating assembly 100 arranged for compensating thermal expansion differences, e.g. caused by heating and cooling cycles of the device 500, while having a uniform temperature distribution in the whole part thereof.

In some embodiments, e.g. as shown in FIGS. 5A-B and 6A-B, the device 500 comprises a temperature sensor 510 arranged for measuring a temperature of the primary heating tube 110H. For example, the temperature sensor 510 can be a thermocouple, such as an N- or K-type thermocouple, or a high temperature resistance temperature detector (RTD), or any other suitable type of temperature sensor. To measure the temperature of the primary heating tube 110H, the temperature sensor 510 can be mechanically attached to a central area of the primary heating tube 110H. Alternatively, the temperature sensor 510 can be mechanically attached to a distal area of the primary heating tube 110H. As such, based on the measured temperature of the primary heating tube 110H, the temperature sensor can e.g. be used for determining the temperature of the heating assembly 100 and/or e.g. an analyte heated by the heating assembly 100.

In other or further embodiments, the device 500 can comprise a controller 550 arranged for controlling an electric current passing through the electrical path 180 based on measurements from the temperature sensor 510. For example, the controller 550 can be part of a software workstation, a computer, or a processing unit. The controller 550 can for example be arranged on board of the device 500, e.g. as an integrated part, or can be a separate unit, operatively connected to the device 500. As such, heating of the device 500 can be controlled by the controller 550 based on actual measurements of the temperature sensor 510 in an accurate and automated fashion, e.g. by having closed loop temperature control of the device 500 to follow a specific heating profile. Accordingly, heating of an analyte by the device 500 can be performed with sophisticated control.

Figure 6:
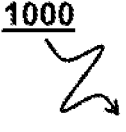
FIG. 6 illustrate a chromatography system comprising the inlet and cold trap.

In yet other or further embodiments, e.g. as shown in detail in FIGS. 5B and 6, the device 500 can comprise a cooling circuit 580, arranged for cooling the inner and outer tubes 110, 120. In some embodiments, the cooling circuit 580 can e.g. extend between an inlet 205, such as an inlet duct or pipe, and an outlet 209, such as an outlet duct or pipe, disposed on the outer tube 120, such that the cooling circuit 580 passes through the radial gap G between the inner wall 121 of the auxiliary heating tube 120H and the outer wall 111 of the primary heating tube 110H. The outlet can also be e.g. a cutout, slot, or hole in the heating assembly 100, for example provided in the outer tube 120 with the extendible section 125 arranged between the inlet 205 and the outlet 209, such that cooling medium passing along the cooling circuit 580 is brought into contact with the inner wall 121 of the auxiliary heating tube 120H, and correspondingly the extendible section 125. Alternatively, or additionally, the inner tube 110 and/or outer tube 120 can comprise cooling fins, e.g. extending within the radial gap G and/or extending outward beyond an external surface of the outer tube 110, and the cooling circuit 580 can be arranged for cooling the inner and outer tubes 110, 120 by passing cooling medium past the cooling fins. As such, cooling of the device 500, e.g. from a heated temperature back to room temperature or to a lower temperature, can be performed more rapidly compared to conventional heating devices, by having both the inner tube 110 and outer tube 120 cooled simultaneously. For example when the device 500 is used as an inlet, this may reduce the time between injection of samples into a gas chromatography system, thereby increasing throughput. For example when the device 500 is used as a cold trap, this may increase the rate of cooling of the analyte.

In some further embodiments, the cooling circuit 580 can be arranged for allowing cooling medium to flow through the radial gap G between the inner and outer wall surfaces 121, 111 of the auxiliary and primary heating tubes 120H, 110H, respectively. Any suitable cooling medium can be supplied via cooling inlet 205, such as compressed air, $CO_2$, liquid nitrogen, and/or cold dry gas, e.g. air or nitrogen, for example. Accordingly, cooling medium can flow past and come into contact with the inner and outer wall surfaces 121, 111 of the auxiliary and primary heating tubes 120H, 110H, respectively, to simultaneously cool the auxiliary and primary heating tubes 120H, 110H, to increase the cooling rate of the device 500.

In some embodiments, the device 500 may form an inlet 1010 for a gas chromatography system. The inlet 1010 can for example be used as a sample introduction port, e.g. for a gas chromatograph. It may comprise a few weldments, such as a main heater tube weldment, a second heater weldment, and a head weldment. The main heater weldment is built around the primary heating tube 110H, shown in FIG. 1. The primary heating tube 110H can e.g. be welded or brazed to the inlet top 216 that may act as a base for mounting of the inlet 1010 and for electrical 131, carrier gas split line 211 and cooling medium 225 connections. A lower part of the primary heating tube 110H may e.g. be welded or brazed to a bottom inlet plate 220. The bottom part of the main heater weldment can provide a connection to a separation column 208. The separation column 208 can for example be connected using a ferrule 218 and a nut 217 to ensure a leak tight connection.

The second heater weldment for example comprises a bellows 125 with an extension 226, an outer tube 120 and a lower electrode 130. The bellows 125 can act as a thermal expansion compensation means but also as an auxiliary heating tube 120H, e.g. to ensure good temperature profile at a bottom section of the inlet 1010. In general, the bellows 125 can be placed anywhere along the second heater weldment length, for instance, just below the lower electrode 130. In such case the auxiliary heating tube 120H at the bottom of the inlet 1010 can e.g. be made out of thin walled material. The second heater weldment can for example be brazed or welded to a main heater weldment bottom plate 220, forming a base for the inlet 1010. A ceramic or a high temperature plastic ring 140 may be placed between the upper and lower electrodes 131, 130 of the heater weldments to provide electrical insulation between them. The ring 140 may not only act as an insulating part, but can e.g. also ensure leak tightness at the top of an inlet cooling chamber provided between the inner and outer walls 121, 111 of the auxiliary and primary heating tubes 120H, 110H, respectively. The inlet 1010 can for example be cooled using any suitable cooling medium supplied via a cooling inlet pipe 205. Cooling medium can escape the cooling chamber via hole 209 at the bottom of the bellows extension 226. To create a mechanically stable construction, the primary heating tube 110H and the second heater weldments can for example be mounted in one assembly using ceramic or high temperature plastic washers 222 and screws 224. To determine the temperature of the inlet 1010, a temperature sensor 510 can be mechanically attached to a central area of the primary heating tube 110H.

In some embodiments, the head weldment can permit opening the inlet port to exchange a liner and to place a sample, e.g. for heating and injecting an analyte to be analyzed by a chromatography system. The liner is typically a glass or metal tube, which can be inserted into the inlet 1010 to ensure an inert environment for the introduction of a sample into the separation column 208. The head weldment may comprise a top boss 219, a carrier gas supply inlet 210, a high temperature rubber septum 212, a septum nut 225, and a needle guide 213. To ensure leak tightness of the inlet 1010, a high temperature rubber O-ring 7 can be placed on the liner and in-between the top boss 219 and the inlet top 216. Accordingly, a liquid sample can be introduced into the inlet 1010 using a syringe via an opening in the head weldment, which is sealed by the septum 212.

Accordingly, while ensuring a uniform temperature distribution during heating of a sample, the inlet 1010 can have improved reliability and durability by comprising a heating assembly 100 with an extendible section 125 arranged for compensating internal thermal expansion differences, e.g. caused by cyclic thermal loading of the inlet 1010.

In other or further embodiments, the device 500 may form a cold trap 1020, sometimes referred to as a cryogenic trap, for a gas chromatography system. The cryogenic trap 1020 can for example be used for cooling a fraction of a separation column 208 inserted through a primary heating tube 110H, see FIG. 2. A purpose behind this is to improve the separation of low boiling temperature sample components, i.e. volatiles. The trap main heater weldment may consist of a primary heating tube 110H, which can e.g. be welded or brazed on both ends to a bellows 125, for example via small center rings. The bellows 125 can act as a thermal expansion compensation means but also as an auxiliary heating tube 120H, e.g. to ensure a uniform temperature distribution along the length of the primary heating tube 110H of the cold trap 1020. Axial ends of the bellows 125 can e.g. be welded or brazed to electrodes 130, e.g. arranged for providing electrical connections to a current source via wires 135. The electrodes 130 are e.g. rigidly mounted onto a cooling chamber body 590 via insulating washers 140 which may be made out of a high temperature plastic, e.g. having a melting temperature of at least 300 degrees Celsius. The washers 140 can for example act not only as insulating parts but may also ensure leak tightness of the cooling chamber. Having a leak tight cooling chamber can significantly increase the cooling performance of the heating assembly 100 and/or the cold trap 1020. The cold trap 1020 can be cooled using any suitable cooling medium, which may be supplied via a cooling inlet 205. Cooling medium can e.g. escape the cooling chamber via an exhaust pipe 209. To measure the temperature of the cold trap 1020, a temperature sensor 510 can e.g. be mechanically attached to a central area of the primary heating tube 110H.

As such, the cold trap 1020 can for example be formed by a device 500 comprising a heating assembly 100 with an extendible section 125 at each axial end of the cold trap 1020, to ensure a uniform temperature distribution during heating of a sample after cryogenic trapping of the sample, while having improved reliability and durability by compensating internal thermal expansion differences, e.g. caused by cyclic thermal loading.

FIG. 6 illustrates a chromatography system 1000 comprising a heating assembly 100 and/or a device 500. The chromatography system 1000 can for example be arranged for separating components of a mixture, and the heating assembly 100 and/or the device 500 may e.g. form an inlet 1010 for introducing a sample to be analyzed by the chromatography system 1000 and/or a cold trap 1020 for improving the separation of low boiling temperature sample components. In gas chromatography, the mixture is vaporized and carried through a stationary phase, e.g. a metal or glass separation column 1100, with a carrier gas, typically helium, hydrogen, nitrogen or argon. Larger molecules in the mixture take longer to pass from the inlet through the column and reach the detector 1200 at the far end. Typical inlet pressure can range from several kilopascal and up to 800 kilopascal. Inlet pressure values can e.g. be used for controlling gas flow through the column in the range 0.1-20 milliliter per minute, or higher. The column 1100 typically has an internal diameter ranging between 0.1 millimeter and 0.55 millimeter, and a length ranging between 5 centimeter up to 100 meter, or more.

For example, the chromatography system 1000 can comprise a heating assembly 100 as part of one or more devices 500 of the chromatography system 1000. The device 500 can e.g. be an inlet 1010, for injecting a sample into chromatography system 1000 and/or a cold trap 1020, for cooling the sample downstream the inlet 1010. The chromatography system 1000 can further comprise e.g. a column 1100, extending between the inlet 1010 and a detector 1200. The detector 1200 can for example be arranged for analyzing the sample passing through the column 1100.

Accordingly, while ensuring uniform temperature distribution during heating and/or reheating of samples, the chromatography system 1000 can have improved reliability and durability by comprising one or more heating assemblies 100 and/or devices 500 with one or more extendible sections 125 arranged for compensating internal thermal expansion differences, e.g. caused by cyclic thermal loading.

Other aspects of the present disclosure relate to use of the heating assembly 100 and/or the device 500 described herein as an inlet and/or a cold trap in a chromatography system. For example, the heating assembly 100 and/or device 500 can be used as an inlet and/or a cold trap in a laboratory setting, or other analytical setup or configuration for a chromatography system, e.g. for analyzing a sample by separating components of a mixture.

For the purpose of clarity and a concise description, features are described herein as part of the same or separate embodiments, however, it will be appreciated that the scope of the invention may include embodiments having combinations of all or some of the features described. For example, while embodiments were shown for a heating assembly forming part of an inlet or cold trap, also alternative ways may be envisaged by those skilled in the art having the benefit of the present disclosure for achieving a similar function and result. For example, parts of the respective assemblies may be combined or split up into one or more alternative components. The various elements of the embodiments as discussed and shown offer certain advantages, such as improved heating uniformity as well as improved structural reliability of a temperature controlled device. Of course, it is to be appreciated that any one of the above embodiments or processes may be combined with one or more other embodiments or processes to provide even further improvements in finding and matching designs and advantages. It is appreciated that this disclosure offers particular advantages to gas chromatography, and in general can be applied also in other systems and methods employing a heating and/or cooling tube—particularly those applications benefitting from rapid heating and/or cooling.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. A heating assembly, comprising:
   a primary heating tube made of electrically conductive material and forming at least part of an inner tube;
   an auxiliary heating tube made of electrically conductive material and forming at least part of an outer tube;
   a pair of flanges which mechanically and electrically interconnect the inner tube with the outer tube, wherein the inner and outer tubes extend between the flanges with the inner tube arranged inside the outer tube, wherein the primary and auxiliary heating tube axially overlap at least along a subsection length of the inner and outer tubes, respectively, between the flanges;
   wherein, along the subsection length, an inner wall surface of the auxiliary heating tube faces an outer wall surface of the primary heating tube for transferring auxiliary heat from the auxiliary heating tube to the primary heating tube over a radial gap between the inner and outer wall surfaces; and
   a pair of electrodes, connected to respective parts of the electrically conductive material and arranged for forming an electrical path through the primary and auxiliary heating tubes via the electrically conductive material;
   wherein the outer tube comprises an electrically insulating section arranged for mechanically connecting, while electrically separating, parts of the electrically conductive material, to have the electrical path exclusively passing in series through respective parts of the primary and auxiliary heating tubes;
   wherein the auxiliary heating tube comprises an extendible section, configured to axially extend or shorten for compensating any difference in thermally induced contraction or expansion, respectively, between the inner tube and the outer tube.

2. The heating assembly according to claim 1, wherein the extendible section comprises a foldable structure.

3. The heating assembly according to claim 2, wherein the extendible section comprises a bellows formed by an axially corrugated tube, comprising a series of corrugations having corrugation amplitudes arranged in a radial direction of the auxiliary heating tube and corrugation pitches arranged in an axial direction of the auxiliary heating tube.

4. The heating assembly according to claim 3, wherein the series of corrugations form part of the electrical path, wherein the extendible section, as part of the auxiliary heating tube, is arranged for generating and transferring auxiliary heat across the radial gap from said part of the auxiliary heating tube to the primary heating tube.

5. The heating assembly according to claim 1, wherein the extendible section has an inner diameter defining at least part of the radial gap between the inner and outer wall surfaces of the auxiliary and primary heating tubes, respectively, wherein the radial gap is between two and six millimeters.

6. The heating assembly according to claim 1, wherein the extendible section has a wall thickness that is the same or similar as the wall thickness of the primary heating tube, at least within a factor 1.5.

7. The heating assembly according to claim 1, wherein the primary heating tube and the extendible section are made of the same or similar electrically conductive material having the same or similar thermal expansion coefficient within ±5%.

8. The heating assembly according to claim 1, wherein the extendible section is configured to accommodate reversible elastic axial extension or shortening of at least one millimeter.

9. The heating assembly according to claim 1, wherein the extendible section is configured to seal the radial gap between the inner and outer wall surfaces.

10. A temperature controllable device comprising:

the heating assembly according to claim 1;

a temperature sensor configured to measuring a temperature of the primary heating tube; and a controller configured to control an electric current passing through the electrical path based on a measurement of the temperature sensor.

11. The temperature controllable device according to claim 1, further comprising a cooling circuit arranged for cooling the inner and outer tubes.

12. The temperature controllable device according to claim 11, wherein the cooling circuit is configured to flow a cooling medium through the radial gap between the inner and outer wall surfaces of the auxiliary and primary heating tubes, respectively.

13. An inlet for a gas chromatography system comprising the temperature controllable device according to claim 10.

14. A cold trap for a gas chromatography system comprising the temperature controllable device according to claim 10.

15. A chromatography system comprising the inlet of claim 13.

16. A chromatography system comprising the cold trap of claim 14.

* * * * *